United States Patent [19]

Stutz, Jr.

[11] 4,162,049
[45] Jul. 24, 1979

[54] FISHING REEL APPARATUS

[76] Inventor: William H. Stutz, Jr., 231 N. Hollywood Way, Burbank, Calif. 91505

[21] Appl. No.: 833,238

[22] Filed: Sep. 14, 1977

[51] Int. Cl.² .......................................... A01K 89/02
[52] U.S. Cl. ............................ 242/84.5 R; 242/84.53; 403/220
[58] Field of Search ................ 242/84.51 R, 84.51 A, 242/84.5 R, 84.53, 212, 213, 214, 68.3; 403/220

[56] References Cited

U.S. PATENT DOCUMENTS

| 683,940 | 10/1901 | Howe | 242/84.51 R |
|---|---|---|---|
| 1,995,221 | 3/1935 | Pell et al. | 242/84.5 R |
| 2,180,566 | 11/1939 | Thompson | 242/84.51 R |
| 2,535,584 | 12/1950 | Lorenz | 242/84.53 |
| 2,536,149 | 1/1951 | Anest | 242/68.3 |
| 2,569,322 | 9/1951 | Mayhew | 242/84.51 R |
| 2,725,201 | 11/1955 | Miller | 242/84.53 |
| 2,964,257 | 12/1960 | Hull | 242/84.51 A |
| 2,993,660 | 7/1961 | Parks | 242/84.51 R |
| 3,166,268 | 1/1965 | Clark | 242/84.53 |
| 3,958,771 | 5/1976 | Everett et al. | 242/84.53 |

FOREIGN PATENT DOCUMENTS 10527 of 1908 United Kingdom .................. 242/84.53

Primary Examiner—Billy S. Taylor
Attorney, Agent, or Firm—Poms, Smith, Lande & Rose

[57] ABSTRACT

A fishing reel for storing, retrieving and controlling the withdraw of fishing line from the fishing reel has support spindle means rotatably mounted with respect to a reel frame for supporting and mounting a line spool, means for preventing relative rotation between the spindle means and the line spool, drag hub means rotatably mounted to the reel frame and operationally connected to the support spindle means by a unidirectional clutch, drag shoe means for restricting rotation of the drag hub means relative to the reel frame, variable means for pre-selectably varying the contact pressure between the drag means and the drag shoe means, manual brake means for supplementally restricting rotation of the line spool and actuator means associated with the varible means and the manual brake means for actuating the variable means when the actuator means is adjusted circumferentially with respect to the reel frame and for actuating the manual brake means when the actuator is adjusted radially with respect to the reel frame.

9 Claims, 10 Drawing Figures

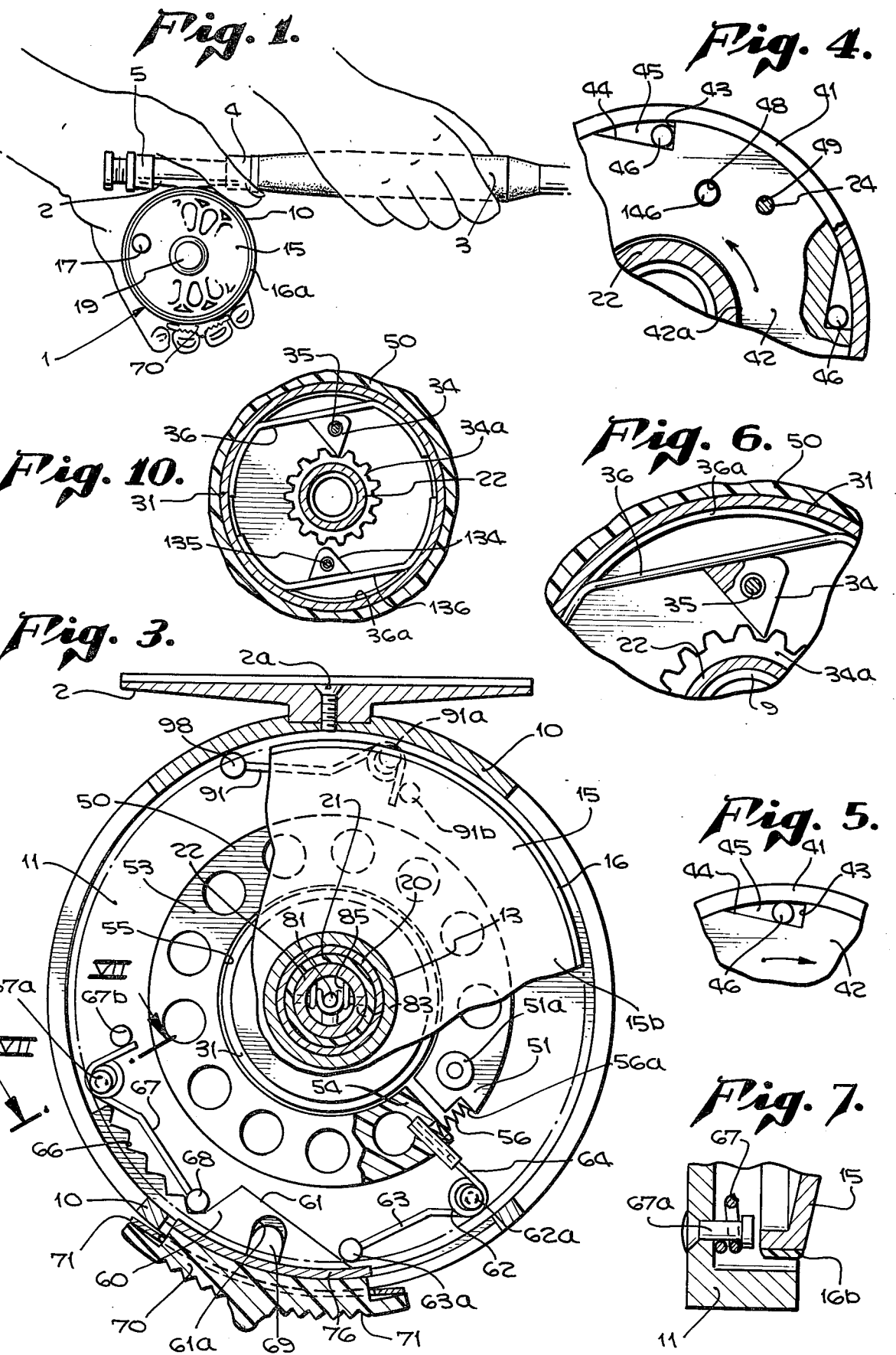

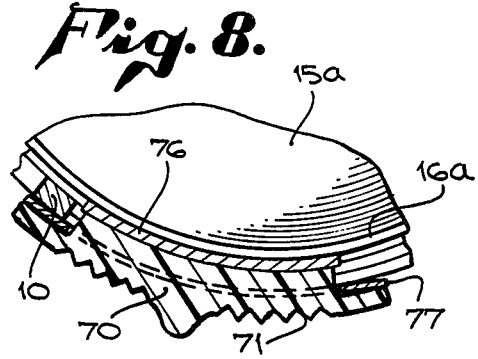
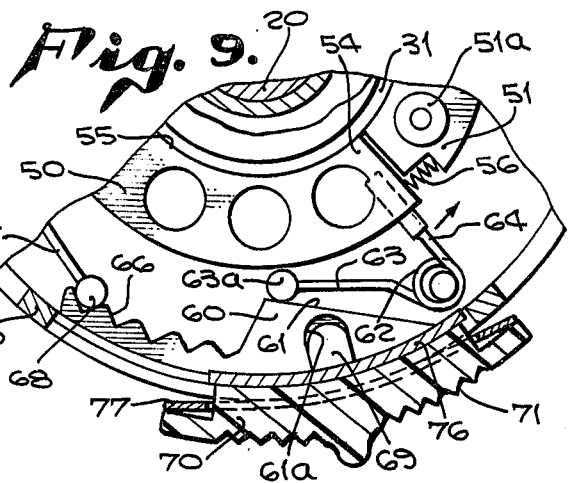

FISHING REEL APPARATUS

BACKGROUND OF THE INVENTION

The present invention relates in general to fishing reels for storing, retrieving and controlling the withdraw of fishing line from the fishing reel. More particularly, the present invention relates to reels used in fly fishing and having a drag mechanism for restricting the withdraw of fishing line from the fishing reel and a manual brake mechanism for supplementing the restrictive force of the drag mechanism.

The prior art fly fishing reels which have incorporated a pre-settable drag mechanism have incorporated various pressure plate/slip clutch assemblies between the winding crank and various elements of the drive mechanism which rotates the line spool, exemplary of which is Clark, U.S. Pat. No. 3,166,268. Other prior art references have utilized drag mechanism which act upon the end of a line spool or the side flange of a line spool or, as shown in Sarah, U.S. Pat. No. 3,478,976, between a line spool end surface and the winding crank itself.

These prior art drag mechanisms which have utilized various portions of the line spool as an element of the drag mechanism have been found to be only marginally satisfactory in those applications where the fishing reel is exposed to substantial load, such as in fishing for salmon and other large fish, due to the potential for distortion of the line spool itself or the mis-alignment of the line spool with respect to the reel frame caused by the application of drag forces directly to the line spool.

Prior art manual brake mechanisms which are manually operated to restrict rotation of the line spool and make withdraw from the line spool more difficult have incorporated brake elements which act upon spool collars when the braking device is rocked upon a reel cross member, as shown in Miller, U.S. Pat. No. 2,725,201 or have incorporated brake elements which act upon the spool end surfaces, between the spool end surface and the outer reel housing or upon the surface of the coiled line wrapped about the line spool. These prior art references tend to apply the braking force asymmetrically to the line spool which tends to force the line spool out of alignment with respect to the reel frame or, in those case were the braking force is applied directly to the surface of the coiled line wrapped about the line spool, result in fraying of the fishing line and an attendant reduction in its strenght.

A further disadvantage of the prior art attempts to provide a pre-settable drag mechanism and a manually operable brake mechanism for supplementing the drag mechanism have utilized a separate actuator for each of the mechanisms. Thus, the fisherman is unable to manipulate both the drag mechanism and the manual brake mechanism at the same time due to the primary requirement of grasping the fishing rod with at least one hand.

SUMMARY OF THE INVENTION

It is, therefore, an object of the present invention to disclose and provide an improved drag mechanism for a fly fishing reel which does not act directly upon the line spool.

It is a further object of the present invention to disclose and provide improved manual brake means for supplementing the drag mechanism.

It is a further object of the present invention to disclose and provide actuator means for actuating the drag means and the brake means simultaneously with one hand, thus leaving the other hand free to control the fishing rod.

It is a further object of the present invention to disclose and provide improved latch means for releasably securing the line spool with respect to the reel frame.

Generally stated, the present invention in an improved fishing reel includes the provision of support spindle means rotatably mounted with respect to a reel frame for supporting and mounting a line spool. Means are provided for preventing relative rotation between the support spindle means and the line spool. Drag hub means rotatably mounted to the reel frame is operationally connected to the support spindle means by a unidirectional clutch and drag shoe means having a portion thereof fixedly mounted relative to the frame and being generally coplanar with and in contact with substantial peripheral portions of the drag hub means restrict rotation of the drag hub means relative to the reel frame.

Variable means are provided for pre-selectably varying the contact pressure between the drag hub means and the drag shoe means in order to pre-selectably vary the amount the rotation of the drag hub is restricted. Manual brake means having arcuate pressure plate means mounted to the reel frame adjacent peripheral rim portions of the line spool supplementally restrict rotation of the line spool when the pressure plate means is manually adjusted radially inwardly relative to the line spool and is brought into contact with the peripheral rim portions of the line spool. Actuator means associated with the variable means and the manual brake means actuate the variable means when the actuator means is adjusted circumferentially with respect to the reel frame and actuate the manual brake means when the actuator is adjusted radially with respect to the reel frame.

Latch means for releasably securing the line spool with respect to the support spindle means have retainer means extending through a generally coaxial bore within the support spindle means for releasably engaging a portion of the line spool. The retainer means comprises an elongated rod pivotally mounted intermediate the end portions thereof and having an enlarged first terminal portion with an integral abutment shoulder for engaging a cooperating opposing abutment associated with the line spool when the line spool is mounted on the support spindle means and the retainer means is in a latching position. Bias means are provided for pivoting the elongate rod into a latching position. The bias means are manually overcome by adjusting a second terminal portion of the elongate rod to unlatch the latch means and remove the line spool from the support spindle means.

A more complete understanding of the improvement in fishing reels and latch means for releasably securing a line spool with respect to the reel frame in accordance with the present invention, as well as recognition of additional objects and advantages therefor, will be afforded to those skilled in the art from a consideration of the following detailed description of an exemplary embodiment thereof. Reference will be made to the appended sheets of drawings which will first be discussed briefly.

BRIEF DESCRIPTION OF THE DRAWINGS

FIG. 1 is a side view of the fishing reel of the present invention mounted on a conventional fly rod.

FIG. 2 is a partial sectional view through the plane II—II of FIG. 1.

FIG. 3 is a partial side-sectional view through the plane III—III fo FIG. 2 showing in detail the variable means of the present invention.

FIG. 4 is a partial side-sectional view through the plane IV—IV of FIG. 2 showing in detail the unidirectional clutch of the present invention disengaged.

FIG. 5 is a detailed view showing the mode of engagement of the unidirectional clutch of the present invention.

FIG. 6 is a partial side-sectional view through the plane IV—IV of FIG. 2 showing in detail the clicker pawl assembly of the present invention.

FIG. 7 is a detailed view through the plane VII—VII of FIG. 3.

FIG. 8 is a detailed view showing the operation of the actuator means for the present invention in a radial direction for actuating the manual brake means.

FIG. 9 is a detailed view showing the operation of the actuator means of the present invention generally circumferentially with respect to the reel frame for actuating the variable means associated with the drag shoe means of the present invention.

FIG. 10 is a detail view showing a replacement clicker pawl and spring mounted within the drag hub of the fishing reel.

DETAILED DESCRIPTION OF AN EXEMPLARY EMBODIMENT

Referring first to FIG. 1, the fishing reel of the present invention is shown generally at 1 and is secured and mounted to fishing rod 3 by interlocking engagement between mounting foot 2, reel seat 4 and adjustable clamping ring 5. Mounting foot 2 is secured to the reel frame by fastening means such as a screw 2a or the like. A line spool 13 is rotatably mounted with respect to the reel frame such that, as operating handle 17 is rotated by the fisherman, fishing line is retrieved into the reel for storage.

In the exemplary embodiment of the present invention shown in FIGS. 2 and 3, the fishing reel frame has a generally circular end plate 11 and apertured side-walls 10 extending therefrom to form a generally cylindrical cup-like body portion. A non-rotatable axle shaft 22 is rigidly secured to circular end plate 11 by flaring the terminal portion 22a of axle shaft 22 such that it is fixedly secured within bevelled central aperture 12 of circular side plate 11. Bezel 9 is fitted to axle shaft 22 from the reverse side of circular end plate 11 to cover any sharp edges produced by the flaring of terminal portion 22a and prevent damage to flared portion 22a which might loosen axle shaft 22 where it is joined to circular end plate 11. Axle shaft 22 extends from circular end plate 11 coaxially through the cup-like body portion of the reel frame formed by apertured side-walls 10.

A line-spool 13 is rotatably mounted with respect to reel frame 10 and axle shaft 22. Line spool 13 may be of one-piece construction or may be assembled from component parts as is shown in FIG. 2. Line spool 13 is provided with threaded terminal portions 13a and 13b and flanges 14a and 14b respectively located inboard and adjacent to the respective threaded portions. Line spool side plates 15a and 15b are apertured to receive terminal threaded portions 13a and 13b respectively and are secured adjacent flanges 14a and 14b by means of cap nut 19 and alignment plate 18 respectively to form the line spool.

Support spindle means shown generally at 20 in FIGS. 2 and 3 is mounted on axle shaft 22 and is rotatable with respect to the reel frame. Bearing member 21 is interposed between support spindle means 20 and axle shaft 22 to maintain coaxial alignment therebetween and reduce friction during rotation of support spindle means 20 relative to axle shaft 22. Axial movement of support spindle means 20 and bearing member 21 is restricted by means of end cap 23 which threadedly engages axle shaft 22. Support spindle means 20 supports and mounts line spool 13 within the reel frame such that the line spool is free to rotate relative to the reel frame. Alignment key 24 extends through aperture 25 in support spindle means 20 and engages alignment apertures 18a located generally peripherally about alignment plate 18 which, as was discussed prior, forms an element of line spool 13. Alignment key 24 thus prevent relative rotation between support spindle means 20 and line spool 13 when the line spool is secured to the support spindle means.

Latch means are provided for releasably securing line spool 13 to support spindle means 20. As best seen in FIG. 2, the latch means of the present invention comprise retainer means shown in the exemplary embodiment as an elongate rod 81 which extends through a generally coaxial bore 82 which extends through the reel and is generally coaxially aligned within axle shaft 22, support spindle means 20 and line spool 13. Elongate rod 81 is pivotally mounted intermediate the end portions thereof by means of pivot shaft 83 which is mounted within internal bore 82 across a diameter thereof. Elongate rod 81 has an enlarged terminal portion 84 with an integral abutment shoulder 84a for engaging a cooperating opposing abutment associated with line spool 13 when line spool 13 is mounted on spindle means 22 and elongate rod 81 is in a latching position. The specific exemplary embodiment in reel spools shown in FIG. 2 utilizes a cooperating opposing abutment 86 which is formed by securing a circular washer 87 having a coaxial aperture 87a therethrough which is secured between washer seat 88 of reel spool 13 and washer retainer element 19a of cap nut 19.

Bias spring means 85 pivot elongate rod 81 into a latching position, as shown in FIG. 2. To unlatch the latch means of the present invention, the biasing force of bias spring 85 is manually overcome by adjusting a second terminal portion 89 of elongate rod 81 such that elongate rod 81 is generally coaxially aligned within coaxial bore 82 and abutment shoulder 84a of elongate rod 81 is no longer engageable with opposing abutment shoulder 86 associated with line spool 13.

From the foregoing description of an exemplary embodiment in latch means it should be understood by those skilled in the art that the latch means of the present invention is not limited solely to fishing reel applications but may, in fact, releasably secure any first body with respect to any second body such that relative rotation therebetween about an axis of rotation is unimpeded while, at the same time, relative linear movement therebetween along the axis of rotation is restricted. Spindle means having a generally coaxial central bore therethrough are mounted to the first body coaxially aligned with the axis of rotation between the first and second bodies for supporting and aligning the second body with respect to the first body. Means associated with the second body receive the spindle means associated with the first body, and retainer means extending through the central bore of the spindle means, pivotally mounted relative to the spindle means, releasably engage a portion of the second body and secure the second body relative to the spindle means and restrict relative linear movement therebetween along the axis of rotation between the first and second bodies.

To restrict withdrawal of fishing line from the reel, a drag assembly is provided which pre-selectively varies the tension required to withdraw fishing line from the reel against the drag.

Drag hub means 30, as shown in FIG. 2, is rotatably mounted to reel frame 10. Axle shaft 22 coaxially aligns drag hub means 30 with respect to reel frame 10 while, at the same time, allowing drag hub means 30 to freely rotate with respect to the reel frame.

Drag hub means 30 is operationally connected to support spindle means 20 by a unidirectional clutch which permits support spindle means 20 to freely rotate in one direction with respect to drag hub means 30 and which prevents relative rotation between drag hub means 30 and support means 20 in the other direction.

As best seen in FIGS. 2, 4, and 5, the unidirectional clutch comprises a clutch housing 41 formed integral of drag hub means 30 and having a generally circular cup-like configuration. Bearing member 47 is interposed between ratchet plate 42 and drag hub means 30 to prevent binding therebetween during relative rotation of ratchet plate 42 with respect to drag hub means 30. As shown in FIG. 2, bearing member 47 may comprise a thin disc of teflon or like material having a low coefficient of friction. Ratchet plate 42 has a central aperture 42a which receives axle shaft 22 and is provided with a plurality of abutment shoulders 42 spaced equidistant from each other circumferentially about ratchet plate 42. For the sake of brevity, the portion of ratchet plate 42 shown in detail in FIG. 5 will be discussed, it being understood that the plurality of abutment shoulders each function in like manner.

Angular recess 45 is formed generally radially inwardly from a circumferential edge of ratchet plate 42 by abutment shoulder 43 and ramp 44 which extends from the base of abutment shoulder 43 to the periphery of ratchet plate 42. Clutch roller 46 is positioned within angular recess 45 and is circumferentially retained therein by clutch housing 41.

Referring now to FIGS. 4 and 5, it may be seen that as ratchet plate 42 is rotated counterclockwise, clutch rollers 46 are moved in a counterclockwise direction by abutment shoulders 43 and do not contact clutch housing 41 as may most clearly be seen in FIG. 4. Upon clockwise rotation of ratchet plate 42, however, clutch rollers 46 are no longer positioned against clutch shoulders 43. Rather, clutch rollers 46 tend to be guided radially outwardly with respect to ratchet plate 42 by ramps 44 such that the clutch rollers become wedged between the surface of ramp 44 and the inner circumferential surface of clutch housing 41. This wedging prevent further clockwise rotation of ratchet plate 42 with respect to clutch housing 41, as may best be seen in FIG. 5.

It should be noted from a consideration of FIG. 2 that clutch rollers 46 have a length generally greater than the thickness of ratchet plate 42. Thus, clutch rollers 46 additionally provide a spaced relation between clutch housing 41 and support spindle means 20 such that ratchet plate 42 does not bind within clutch housing 41 and is able to freely rotate therein.

As best seen in FIG. 2, alignment key 24 extends through aperture 49 in ratchet plate 42. Ratchet plate 42, support spindle means 20 and line spool 13 are rotatably mounted with respect to axle shaft 22 but are prevented from rotating relative to each other by alignment key 24. The locking of line spool, support spindle means and ratchet plate operationally connects drag hub means 31 and line spool 13 and the unidirectional clutch allows a fisherman to easily reel in line while, at the same time having the drag fully operational to retard the withdrawal of fishing line by a fish.

Individual fishermen may desire to operate the fishing reel with either the left or right hand. The particular embodiment of unidirectional clutch of the present invention is adaptable to these differences as the clutch may be reversed to change the direction the line spool may be freely rotated.

To reverse the direction in which ratchet plate 42 may be freely rotated, which will, in turn, reverse the direction in which support spindle means 20 and line spool 13 may be rotated with respect to the reel frame, clutch housing 41 and drag hub means 30, ratchet plate 42 may be removed from axle shaft 22, inverted with respect thereto and reinstall on the axle shaft. This will reverse the angular recesses 45 with respect to clutch housing 41. This reversal will, in turn, allow ratchet plate 42 to be freely rotated in a clockwise direction while preventing counterclockwise rotation thereof contrary to the embodiments shown in FIGS. 4 and 5. Thus an anglar may select the direction of free rotation which best suits his personal fishing style.

To warn the fisherman that line is being take from the reel by a fish, a clicker assembly is provided which produces a clicking sound when drag hub means 30 is rotated due to the wedging action of the clutch rollers 46 between ratchet plate 42 and clutch housing 41.

Clicker gear 34a is non-rotatably mounted with respect to axle shaft 22 and end plate 11 of the reel frame. As seen in FIGS. 2 and 6, clicker gear 34a is mounted adjacent end plate 11 within a clicker housing 32 formed integral of drag hub means 30 by interior surfaces of peripheral flange portions 31 of the drag hub. Clicker housing 32 generally abuts end plate 11 of the reel frame to provide a generally closed chamber for the clicker assembly.

Clicker pawl 34 is pivotally mounted to drag hub means 30 by stud 35. Tip portions of clicker pawl 34 engage clicker gear 34a, as shown in FIG. 6. And, as drag hub 30 is rotated, the clicker pawl moves circumferentially about clicker gear 34a and emits a clicking sound. Return spring 36 is positioned in a circumferential groove within clicker housing 32 and engages the clicker pawl to maintain contact between the pawl and clicker gear 34a as the pawl pivots about stud 35 during rotation of the drag hub.

Drag shoe means 50 are provided for restricting rotation of drag hub means 30 relative to reel frame 10. As best seen in FIGS. 2, 3 and 9, drag shoe means 50 has a first end 51 fixedly mounted with respect to end plate 11 by suitable mounting means shown at 51a. Drag shoe means 50 is mounted generally coplanar with and in contact with a substantial peripheral portion of drag hub means 30 to provide maximum surface area contact therebetween. A resilient central portion 53 of drag shoe means 50 is located adjacent to and substantially encircling peripheral flange portion 31 of drag hub 30 and has a second end 54 movably mounted relative to first and 51 for varying contact pressure between the drag shoe means and the peripheral flange portion of the drag hub.

As shown in FIG. 3, drag shoe means 50 comprises a discontinuous ring having a generally equal thickness relative to peripheral flange portion 31 of drag hub means 30. The discontinous ring has a central generally circular, aperture for receiving the peripheral flange portion of the drag hub, thereby providing a maximum surface area contact for a given diameter and thickness of the peripheral flange portion.

Variable means indicated generally at 60 in FIGS. 2, 3 and 9 are provided for pre-selectively varying contact pressure between drag hub means 30 and drag shoe means 50, thereby preselectively varying the amount that the rotation of drag hub means 30 is restricted. In the exemplary embodiment shown in FIG. 3, wherein drag shoe means 50 comprises a discontinuous ring, variable means 60 adjusts the position of second end 54 of the discontinuous ring relative to first end 51 in order to vary the diameter of central circular aperture 50. As shown in FIG. 9, variable means 60 comprises ramp means 61 for slideably engaging coil spring bias means 62. Coil spring bias means 32 has a first extension 63 having a ramp follower 63a mounted thereon which is engageable with ramp means 61. A second and opposing extension 64 of coil spring bias means 62 is engageable with movably mounted second end 54 of the drag shoe means such that, as ramp means 61 slideably engages ramp follower 63a, tension in coil spring bias means 62 is increased and the biasing force exerted by second and opposing extention 64 of coil spring bias means 62 against the second end 54 of drag shoe means 50 is increased. This increase in biasing force urges second end 54 of drag shoe means 50 toward first end 51 thereof which is fixedly mounted with respect to end plate 11 thereby varying the diameter of central circular aperture 55 of drag shoe means 50 and increasing the drag force which restricts the rotation of drag hub means 30.

Securing means are provided for securing ramp means 61 relative to ramp follower 63a and retaining uniform biasing force against second end 54 of drag shoe means 50. Spring loaded detent means associated with ramp means 61 incrementally secure the ramp means to provide repeatable adjustment of the uniform biasing force. As best seen in FIGS. 3 and 9, detents 66 formed integral of variable means 60 and engageable with detent follower 68 which is mounted to bias spring 67 allow accurate circumferential positioning of variable means 60 with respect to reel frame 10. In thus regulating the position of variable means 60, the relative position of ramp follower 63a relative to ramp means 61 is assured. This, in turn, regulates the biasing force exerted by coil spring bias means 60 upon second end 54 of drag shoe means 50.

In order to insure that drag tension adjustment is positive and reversible, drag shoe means 50 comprises the provision of biasing means shown generally at 56 in FIGS. 3 and 9 as a compressible coil spring interposed between second end 54 of drag shoe means 50 and an abutment 56a associated with first end 51 of drag shoe means 50 tends to bias the first and second end away from each other unless overcome by the biasing force of coil spring bias means 62. Thus, when variable means 60 is adjusted from the position shown in FIG. 9 to the position shown in FIG. 3, the biasing force exerted by coil spring bias means 62 against second end 54 of the drag shoe is decreased and bias means 56 tends to force second end 54 away from first end 51 thereby increasing the diameter of central circular aperture 54 and reducing the contact pressure between drag shoe means 50 and drag hub means 30.

Manual brake means having arcuate pressure plate means 76 are mounted to reel frame 10 adjacent peripheral rim portions 16a and 16b of line spool 13 for supplementally restricting rotation of the line spool when the pressure plate means is manually adjusted radially inwardly relative to line spool 13 and is brought into contact with peripheral rim portions 16a and 16b thereof. Peripheral rim portions 16a and 16b as shown in FIG. 2 may also comprise resilient members generally interposed between the peripheral portions and arcuate pressure plate means 76 for protecting the rim of the spool from becoming deformed and roughened when the line spool is disassembld from the reel frame. Additionally, the manual brake means of the present invention comprise bias means for urging arcuate pressure plate means 76 out of contact with the peripheral rim portions of 16a and 16b of line spool 13, the bias means being manually overridden to operate the manual brake means.

Actuator means 70 associated with variable means 60 and arcuate pressure plate means 76 is provided for actuating the variable means when the actuator means is adjusted circumferentially with respect reel frame 10 and for actuating the manual brake means when the actuator means is adjusted radially with respect to reel frame 10. Connector 69 is attached to actuator means 70 and is positioned within recess 61a of variable means 60 to provide a connection therebetween to adjust variable means 60 when actuator means 70 is adjusted circumferentially.

As shown in FIG. 1, actuator means 70 is located generally opposite mounting foot 2 which secures the fishing reel to the butt portion of fishing rod three. This enables an operator to manipulate actuator means 70 while palming the fishing reel. The other hand thus being left free to control the rod while fighting a large fish or to operate crank handle 17 in order to retrieve any slcak in the fishing line. In order to increase the drag force exerted by drag shoe means 50 against drag hub menas 30, actuator means 70 is moved in a counter-clockwise direction circumferentially with respect to reel frame 10 as is shown in FIG. 9. To decrease the drag force, actuator means 70 is adjusted clockwise with respect to reel frame 10 as is shown in FIG. 3. In order to prevent the operator's hand from slipping out of contact with actuator means 70, the grasping surface of actuator means 70 is provided with surface irregularities 71.

To prevent a large fish from breaking the line when he strikes the lure or bait, it is generally the practice to pre-set the drag to a lower value than the breaking strength of the line. Once a large fish is hooked, it may be dangerous to re-set the drag to a higher value, as any error in setting might again result in a broken line. In these instances, the manual brake means of the present invention may be actuated to supplement the drag should the drag setting prove to be insufficient to prevent a fish from withdrawing line from the fishing reel at the excessive rate. Actuator means 70 may be adjusted radially inwardly with respect to reel frame 10 as is shown in FIG. 8 by a squeezing motion of the operator's fingers. Bias means 77 which are provided between actuator means 70 and reel frame 10 generally urge arcuate pressure plate means 76 out of contact with peripheral rim portions 16a and 16b of line spool 13 but, when the manual brake is operated, bias means 77 is manually overridden as is shown in FIG. 8. Upon releasing actuator means 70, bias means 77 once again urges arcuate pressure plate means 76 out of contact with peripheral rim portions 16a and 16b of reel spool 13 to remove the supplemental restriction of the line spool placed thereon by the manual brake means.

In order to render the fishing reel of the present invention more easily repairable by the fisherman under field conditions, provision is made for the storage of spare parts within the reel itself in such a manner that the functioning of the reel is not hampered. As best seen in FIG. 3, coil spring bias means 62 associated with ramp means 61 of variable means 60 and bias spring 67 associated with detents 66 of variable means 60 have the same configuration. In order to prevent contact between bias spring 67 and drag shoe means 50 while, at the same time, allowing coil spring bias means 62 to interact with a portion of drag shoe means 50, mounting extension 57, in the form a cylindrical tube which extends radially external of a circumferential portion of drag shoe means 50 is provided to receive second extension 64 of coil spring bias means 62. In order to prevent disablement of the fishing reel should either of the aforementioned spring break, a spare bias spring 91 is mounted within reel frame 10 generally adjacent to end plate 11 thereof at a position which does not interfere with the operation of variable means 60 or drag shoe means 50. To releasably secure each of the three springs 62, 67, and 91, the central aperture portion within the coil itself of the respective spring is placed over a stud 62a, 67a and 91a respectively with each stud having an enlarged head portion spaced away from end plate 11. As the springs are tensioned, the central aperture through the coil is reduced in diameter and is displaced radially to engage the enlarge head portion of the stud which then functions as a retainer to secure the spring adjacent the end plate. As may be seen in FIG. 3, each of the springs 62, 67, and 91 has a relatively long first extension thereof which terminates in a follower elements 63a, 68 and 98 respectively and a relatively short second extension thereof which is generally opposed to the first extension. To secure the springs to their respective mounting studs the opposing extensions of each spring are forced generally toward each other with their respective first extensions generally proximate the juncture between circular end plate 11 and the apertured side-walls of reel frame 10 which extend therefrom. The second extensions of the springs are secured adjacent secondary mounting studs 67b and 91b for springs 67 and 91 respectively and, in the case of spring 62, the second extension 64 is secured to second end 54 of drag shoe means 50. The mounting relationship between the individual springs and their respective mounting studs is most clearly shown in FIG. 7 which depicts the relationship between spring 67 and mounting stud 67a which is representative of the relationships for springs 62a and 91 as well.

A spare clutch roller 146 may be mounted within an aperture 48 in ratchet plate 42 in a position such that it does not interfere with the clutching action of the ratchet plate as is best shown in FIG. 4. The presence of a spare clutch roller stored in this manner will allow the clutch to be repaired should it become inoperative due to the loss of one of the clutch rollers during field maintenance of the reel.

Additionally, as the clicker pawl and pawl spring for the clicker operate constantly during each withdrawal of line from the fishing reel, these parts are highly susceptible to fatigue and stress fracturing on the part of return spring 36 and wear on the part of pawl 34. In order to prevent the loss of the warning given by the clicker, a spare clicker pawl 134 and spare return spring 136 may be mounted within clicker housing 32 of drag hub means 30 as is shown in FIG. 10.

Having thus described the exemplary embodiment of various improvements in a fishing reel for storing, retrieving and controlling the withdrawal of fishing line from the fishing reel, it should be understood by those skilled in the art that various alternatives and modifications thereof may be made within the scope and spirit of the present invention which is defined by the following claims.

I claim:

1. In a fishing reel for storing, retrieving, and controlling the withdraw of fishing line from the reel, said fishing reel having a reel frame mountable to an associated fishing rod and a line spool having peripheral spool rim portions rotatably mounted with respect to said reel frame, the improvement in said fishing reel comprising:

support spindle means rotatably mounted with respect to said reel frame for supporting and mounting said line spool;

means for preventing relative rotation between said spindle means and said line spool;

drag hub means having peripheral hub portions and being rotatably mounted to said frame and operationally connected to said support spindle means by a unidirectional clutch;

drag shoe means having a portion thereof fixedly mounted relative to said frame, said drag shoe means being generally coplanar with and in contact with said peripheral hub portions of said drag hub means are provided for restricting rotation of said hub means relative to said frame;

variable means for pre-selectably varying contact pressure between said drag hub means and said drag shoe means thereby pre-selectably varying the amount said rotation of said hub is restricted;

manual brake means operable independently of operation of said drag shoe means having arcuate pressure plate means mounted to said reel frame adjacent said peripheral spool rim portions of said line spool for supplementally restricting rotation of said line spool when said pressure plate means is manually adjusted radially inwardly relative to said spool and is brought into contact with said peripheral rim portions of said line spool; and actuator means associated with said variable means and said manual brake means for actuating said variable means when said actuator means is adjusted circumferentially with respect to said spool and for actuating said manual brake means when said actuator means is adjusted radially with respect to said spool.

2. The fishing reel of claim 1, wherein said drag hub means includes the provision of a substantially circular, relatively thick peripheral flange portion positioned adjacent a reel frame side plate and said drag shoe means has a first end fixedly mounted with respect to said frame, a resilient central portion adjacent to and substantially encircling said peripheral flange portion of said drag hub means and a second end moveably mounted relative to said first end for varying contact pressure between said drag shoe means and said peripheral flange portion as said second end of said drag shoe means is moved relative to said first end and as said resilient central portion is adjusted about said peripheral flange portion of said drag hub means.

3. The fishing reel of claim 2, wherein said drag shoe means comprising:
a discontinuous ring having a substantially equal thickness relative to said peripheral flange portion of said drag hub means and having a central generally circular aperture for receiving said peripheral flange portion, mounting means for securing a first end of said discontinuous ring to said frame, said variable means being for adjustment of a second end of said discontinuous ring relative to said first end in order to vary the diameter of said central circular aperture.

4. The fishing reel of claim 2, wherein said variable means comprises:
ramp means for slideably engaging coil spring bias means;
coil spring bias means having a first extension thereof engageable with said ramp means and a second and opposing extension thereof engageable with said moveably mounted second end of said drag shoe means such that as said ramp means slideably engages said first extension and tensions said coil spring bias means, biasing force exerted by second and opposing extension against said second end of said drag shoe means is increased, thereby urging said second end toward said first end; and
securing means for securing said ramp means and retaining uniform biasing force against said second end of said drag shoe means.

5. The fishing reel of claim 4, wherein said securing means comprises:
spring loaded detent means associated with said ramp means for incrementally securing said ramp means to provide repeatable adjustment of said uniform biasing force.

6. The fishing reel of claim 4, wherein said drag shoe means comprises means for biasing said first and second ends of said discontinuous ring generally away from each other thereby increasing said diameter of said central generally circular aperture.

7. The fishing reel of claim 1, wherein said manual brake means comprises resilient means associated with peripheral rim portions of said line spool and generally interposed between said peripheral spool rim portions and said arcuate pressure plate means when said line spool is assembled to said support spindle means for protecting said peripheral spool rim portions of said line spool from becoming deformed or roughened when said line spool is disassembled from said reel frame.

8. The fishing reel of claim 1, wherein:
latch means are provided for releasably securing said line spool with respect to said support spindle means and said latch means comprise retainer means extending through a generally coaxial bore within said support spindle means for releasably engaging a portion of said line spool and said retainer means comprises an elongate rod privotally mounted intermediate the end portions thereof and having an enlarged rounded end first terminal portion with a integral abutment shoulder for engaging a cooperating opposing abuttment associated with said line spool when said line spool is mounted on said support spindle means and said retainer means is in a latching position; and
bias means for pivoting said elongate rod into a latching position, said bias means being manually overcome by adjusting a second terminal portion of said elongate rod to unlatch said latch means and remove said line spool from said support spindle means.

9. In a fishing reel for storing, retrieving and controlling the withdraw of fishing line from the reel, said fishing reel comprising a reel frame having a generally circular end plate and apertured side-walls extending therefrom to form a generally cylindrical cup-like body portion, a rigidly secured non-rotatable axle shaft extending from said circular end plate coaxially through said cup-like body portion, a line spool having peripheral spool rim portions and being rotatably mounted with respect to said reel frame and said axle shaft and mounting means for securing said fishing reel to an associated fishing rod, the improvement in said fishing reel comprising:
supporting spindle means mounted on said axle shaft rotatable with respect to said reel frame for supporting and mounting said line spool;
latch means for releasably securing said line spool to said support spindle means;
means for preventing relative rotation between said spindle means and said line spool when said line spool is secured to said spindle means;
a drag hub mounted for coaxial rotation relative to said axle shaft, said drag hub having a substantially circular, relative thick peripheral flange portion positioned adjacent said circular end plate;
unidirectional clutch means for operationally interconnecting said drag hub and said support spindle means;
drag shoe means for restricting rotation of said drag hub, said drag shoe means having a first end fixedly mounted with respect to said body portion, a resilient central portion adjacent to and substantially encircling said peripheral flange portion of said drag hub and a second end moveably mounted relative to said first end for varying contact pressure between said drag shoe means and said peripheral flange portion of said drag hub as said second end of said drag shoe means is moved relative to said first end and said resilient central portion is adjusted about said peripheral flange portion of said drag hub;
variable means for pre-selectably varying contact pressure between said drag hub and said drag shoe means thereby pre-selectably varying the amount said rotation of said hub is restricted;
manual brake means having arcuate pressure plate means mounted to said reel frame adjacent peripheral spool rim portions of said line spool for supplementally restricting rotation of said line spool when said pressure plate means is manually adjusted radially inwardly relative to said line spool and is brought into contact with said peripheral spool rim portions of said spool; and
actuator means associated with said variable means and said manual brake means for actuating said variable means when said actuator means is adjusted circumferentially with respect to said generally cylindrical cup-like body portion and for actuating said manual brake means when said actuator means is adjusted radially with respect to said generally cylindrical cup-like body portion.

* * * * *